(12) United States Patent
Shih et al.

(10) Patent No.: US 11,572,884 B2
(45) Date of Patent: Feb. 7, 2023

(54) DIRECT CURRENT BRUSHLESS FAN AND DRIVE APPARATUS

(71) Applicant: Chia-Yuan Liu, Taichung (TW)

(72) Inventors: Cheng-Yi Shih, Taichung (TW); Chieh-Chun Lin, Taichung (TW)

(73) Assignee: Chia-Yuan Liu, Taichung (TW)

( * ) Notice: Subject to any disclaimer, the term of this patent is extended or adjusted under 35 U.S.C. 154(b) by 470 days.

(21) Appl. No.: 16/910,073

(22) Filed: Jun. 24, 2020

(65) Prior Publication Data
US 2021/0277905 A1      Sep. 9, 2021

(30) Foreign Application Priority Data

Mar. 6, 2020   (TW) ................................ 109202492

(51) Int. Cl.
| | |
|---|---|
| *F04D 25/06* | (2006.01) |
| *H02K 5/22* | (2006.01) |
| *H02K 7/14* | (2006.01) |
| *H02K 11/00* | (2016.01) |
| *H02K 9/06* | (2006.01) |

(Continued)

(52) U.S. Cl.
CPC ....... *F04D 25/0606* (2013.01); *F04D 29/626* (2013.01); *H02K 5/04* (2013.01); *H02K 5/225* (2013.01); *H02K 7/14* (2013.01); *H02K 9/06* (2013.01); *H02K 11/0094* (2013.01); *F04D 25/068* (2013.01)

(58) Field of Classification Search
CPC .......... H02K 11/33; H02K 5/225; H02K 9/06; H02K 11/30; H02K 5/04; H02K 11/0094; H02K 2203/03; H02K 2203/09; H02K 2211/03; H02K 7/14; F04D 25/068; F04D 29/626; F04D 25/0606; F04D 25/12
See application file for complete search history.

(56) References Cited

U.S. PATENT DOCUMENTS

| | | | | |
|---|---|---|---|---|
| 5,406,154 | A | * | 4/1995 | Kawaguchi ............. B60L 50/60 |
| | | | | 310/43 |
| 6,278,248 | B1 | * | 8/2001 | Hong ........................ H02P 6/14 |
| | | | | 318/400.26 |

(Continued)

FOREIGN PATENT DOCUMENTS

| | | | | |
|---|---|---|---|---|
| CN | 107588018 | A | * | 1/2018 |
| CN | 110034629 | A | * | 7/2019 ............. H02K 11/33 |

*Primary Examiner* — Dominick L Plakkoottam
(74) *Attorney, Agent, or Firm* — Li & Cai Intellectual Property Office

(57) ABSTRACT

A direct current (DC) brushless fan and a drive apparatus are provided. The drive apparatus includes a housing, a DC brushless motor, a control unit, an adaptation unit, an alternating current (AC) input interface, a DC input interface, and a power storage. The housing includes a first portion and a second portion. A projection path defined by orthogonally projecting the first portion toward the second portion is defined as an installation range. The DC input interface is arranged in the installation range and is electrically connected to the control unit. The AC input interface is arranged in the installation range and is electrically connected to the adaptation unit. The power storage is detachably arranged at an installation position of the housing. When the power storage is arranged at the installation position, the power storage covers the AC input interface and is electrically connected to the DC input interface.

10 Claims, 6 Drawing Sheets

(51) Int. Cl.
*F04D 29/62* (2006.01)
*H02K 5/04* (2006.01)

(56) References Cited

U.S. PATENT DOCUMENTS

| | | | | |
|---|---|---|---|---|
| 2003/0094920 A1* | 5/2003 | Numaguchi | ........... | H02K 11/33 |
| | | | | 318/801 |
| 2003/0117028 A1* | 6/2003 | Agnes | ................... | H02K 29/12 |
| | | | | 310/71 |
| 2006/0226267 A1* | 10/2006 | McPherson | ............... | B02C 1/12 |
| | | | | 241/30 |
| 2008/0116753 A1* | 5/2008 | Carlucci | ................ | H02K 7/145 |
| | | | | 388/816 |
| 2010/0068987 A1* | 3/2010 | Lin | ....................... | F04D 25/068 |
| | | | | 454/341 |
| 2010/0148515 A1* | 6/2010 | Geddry | .................... | F03D 9/25 |
| | | | | 310/156.01 |
| 2014/0132093 A1* | 5/2014 | Purohit | ................. | H02K 9/227 |
| | | | | 310/50 |
| 2016/0315567 A1* | 10/2016 | Velderman | ............. | H02K 11/33 |
| 2018/0342934 A1* | 11/2018 | Wei | ........................ | H02K 21/16 |
| 2021/0123441 A1* | 4/2021 | Coupart | ................ | F04D 29/266 |

\* cited by examiner

DIRECT CURRENT BRUSHLESS FAN AND DRIVE APPARATUS

CROSS-REFERENCE TO RELATED PATENT APPLICATION

This application claims the benefit of priority to Taiwan Patent Application No. 109202492, filed on Mar. 6, 2020. The entire content of the above identified application is incorporated herein by reference.

FIELD OF THE DISCLOSURE

The present disclosure relates to a fan, and more particularly to a direct current (DC) brushless fan and a drive apparatus supplied with an electrical energy from an alternating current or a direct current.

BACKGROUND OF THE DISCLOSURE

A conventional fan includes a motor, a fan blade assembled to the motor, and a power input interface that is electrically connected to the motor. The power input interface is configured to be electrically connected to a utility power (i.e., alternating current), so that the motor can obtain an electrical energy from the utility power to drive the fan blades to rotate. However, the conventional fan can only be electrically connected to the utility power to obtain electrical energy. Therefore, when a user is in an environment (e.g., an outdoor environment) without utility power, the user must extend the utility power to the aforementioned environment through an extension cord, so as to supply the electrical energy to the conventional fan for use. In other words, the conventional fan is easily limited by the condition of the environment being with utility power, so as to cause inconvenience.

SUMMARY OF THE DISCLOSURE

In response to the above-referenced technical inadequacies, the present disclosure provides a direct current (DC) brushless fan and a drive apparatus to effectively improve on the issues associated with the conventional fans.

In one aspect, the present disclosure provides a direct current (DC) brushless fan, which includes a fan seat, a fan blade, and a drive apparatus. The fan blade is disposed in the fan seat. The drive apparatus is disposed on the fan seat and is connected to the fan blade. The drive apparatus is configured to drive the fan blade to rotate. The drive apparatus includes a housing, a DC brushless motor, a control unit, an adaptation unit, an alternating current (AC) input interface, a DC input interface, and a power storage. The housing is disposed on the fan seat. The housing is in a shape of the letter "L" and has a first portion and a second portion that is connected to the first portion. The first portion has a drive space, and the second portion has a setting space in spatial communication with the drive space. A projection path defined by orthogonally projecting the first portion toward the second portion is defined as an installation range. The DC brushless motor is arranged in the drive space. The DC brushless motor is connected to the fan blade. The control unit is disposed in the second portion and electrically connected to the DC brushless motor. The adaptation unit is arranged in the setting space. At least 80% of a volume of the adaptation unit is arranged within the installation range. The adaptation unit is electrically connected to the control unit. The AC input interface is disposed in the second portion and arranged in the installation range. The AC input interface is electrically connected to the adaptation unit. The AC input interface is configured to electrically connect to a utility power. The DC input interface is disposed in the second portion and arranged in the installation range. The DC input interface is electrically connected to the control unit. The power storage is detachably disposed on the second portion and is arranged at an installation position of the second portion. When the power storage is arranged at the installation position of the second portion, the power storage covers the AC input interface and is electrically connected to the DC input interface.

In another aspect, the present disclosure provides a drive apparatus, which is configured to drive a fan blade of a direct current (DC) fan to rotate. The drive apparatus includes a housing, a DC brushless motor, a control unit, an adaptation unit, an alternating current (AC) input interface, a DC input interface, and a power storage. The housing is disposed on the fan seat. The housing is in a shape of the letter "L" and has a first portion and a second portion that is connected to the first portion. The first portion has a drive space, and the second portion has a setting space in spatial communication with the drive space. A projection path defined by orthogonally projecting the first portion toward the second portion is defined as an installation range. The DC brushless motor is arranged in the drive space. The DC brushless motor is connected to the fan blade. The control unit is disposed in the second portion and electrically connected to the DC brushless motor. The adaptation unit is arranged in the setting space. At least 80% of a volume of the adaptation unit is arranged within the installation range. The adaptation unit is electrically connected to the control unit. The AC input interface is disposed in the second portion and arranged in the installation range. The AC input interface is electrically connected to the adaptation unit. The AC input interface is configured to electrically connect to a utility power. The DC input interface is disposed in the second portion and arranged in the installation range. The DC input interface is electrically connected to the control unit. The power storage is detachably disposed on the second portion and is arranged at an installation position of the second portion. When the power storage is arranged at the installation position of the second portion, the power storage covers the AC input interface and is electrically connected to the DC input interface.

Therefore, the DC brushless fan and the drive apparatus of the present disclosure can obtain the electrical energy from the DC input interface or the AC input interface, so that the drive apparatus can not only use utility power (i.e., AC) from the AC input interface as the electrical energy in an indoor environment but also use the power storage (i.e., DC) from the DC input interface as the electrical energy in an outdoor environment (i.e., an environment without utility power). Accordingly, the DC brushless fan is not limited to the environmental condition of requiring utility power, thus providing more convenience for users.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
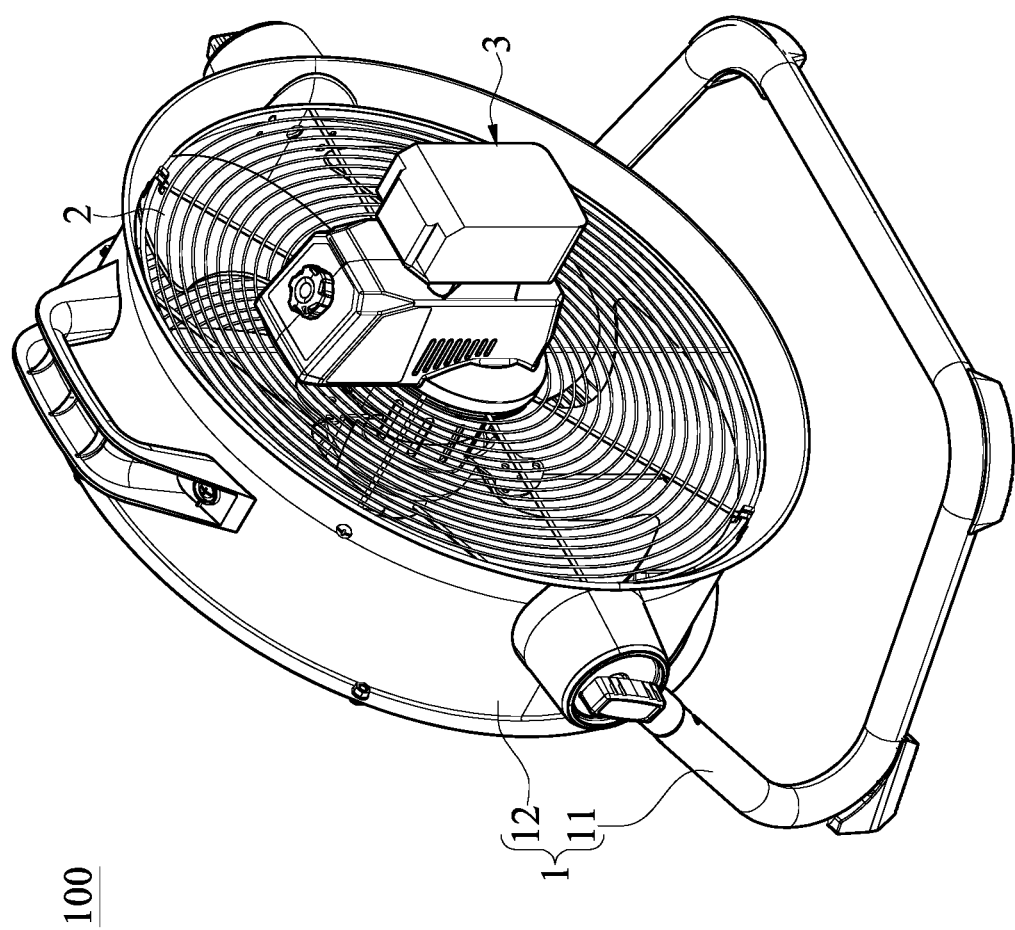
FIG. 1 is a schematic perspective view of a direct current (DC) brushless fan according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 6, an embodiment of the present disclosure provides a direct current (DC) brushless fan 100. The DC brushless fan 100 includes a fan seat 1, a fan blade 2 disposed in the fan seat 1, and a drive apparatus 3 that is disposed on the fan seat 1 and that is connected to the fan blade 2. The following description describes the structure and connection relationship of each component of the DC brushless fan 100.

It should be noted that the fan seat 1, the fan blade 2, and the drive apparatus 3 in the present embodiment are jointly defined as the DC brushless fan 100, but the present disclosure is not limited thereto. For example, the drive apparatus 3 can be independently used (e.g., sold) or can be used in cooperation with other components.

Figure 2:
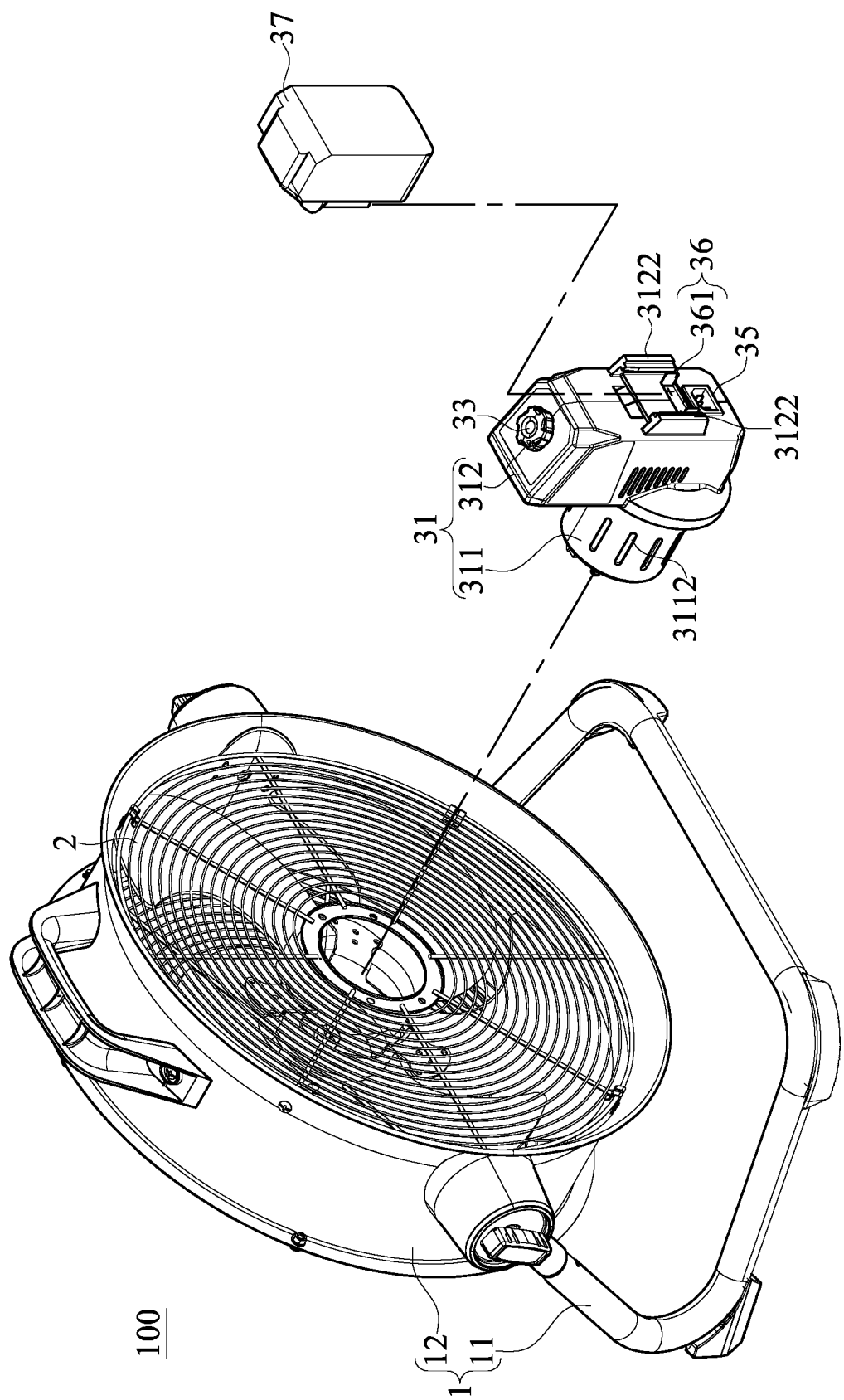
FIG. 2 is a schematic exploded view of the DC brushless fan according to the present disclosure.

Referring to FIG. 1 and FIG. 2, the fan seat 1 in the present embodiment includes a bracket portion 11 and a frame portion 12 that is pivotally connected to the bracket portion 11. The frame portion 12 is configured to be pivoted relative to the bracket portion 11 so as to adjust an angle between the frame portion 12 and the bracket portion 11, but the present disclosure is not limited thereto. The fan blade 2 is disposed in the frame portion 12. The drive apparatus 3 is disposed on the frame portion 12 and is connected to the fan blade 2. The drive apparatus 3 can drive the fan blade 2 to rotate so as to generate airflow.

Figure 3:
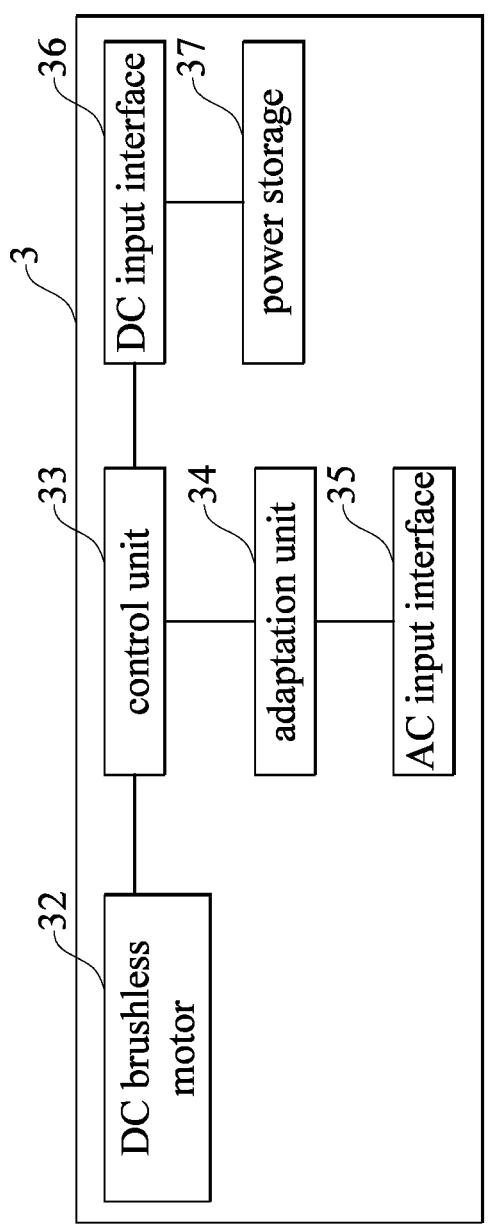
FIG. 3 is a schematic circuit block diagram of a drive apparatus of the DC brushless fan according to the present disclosure.
Figure 4:
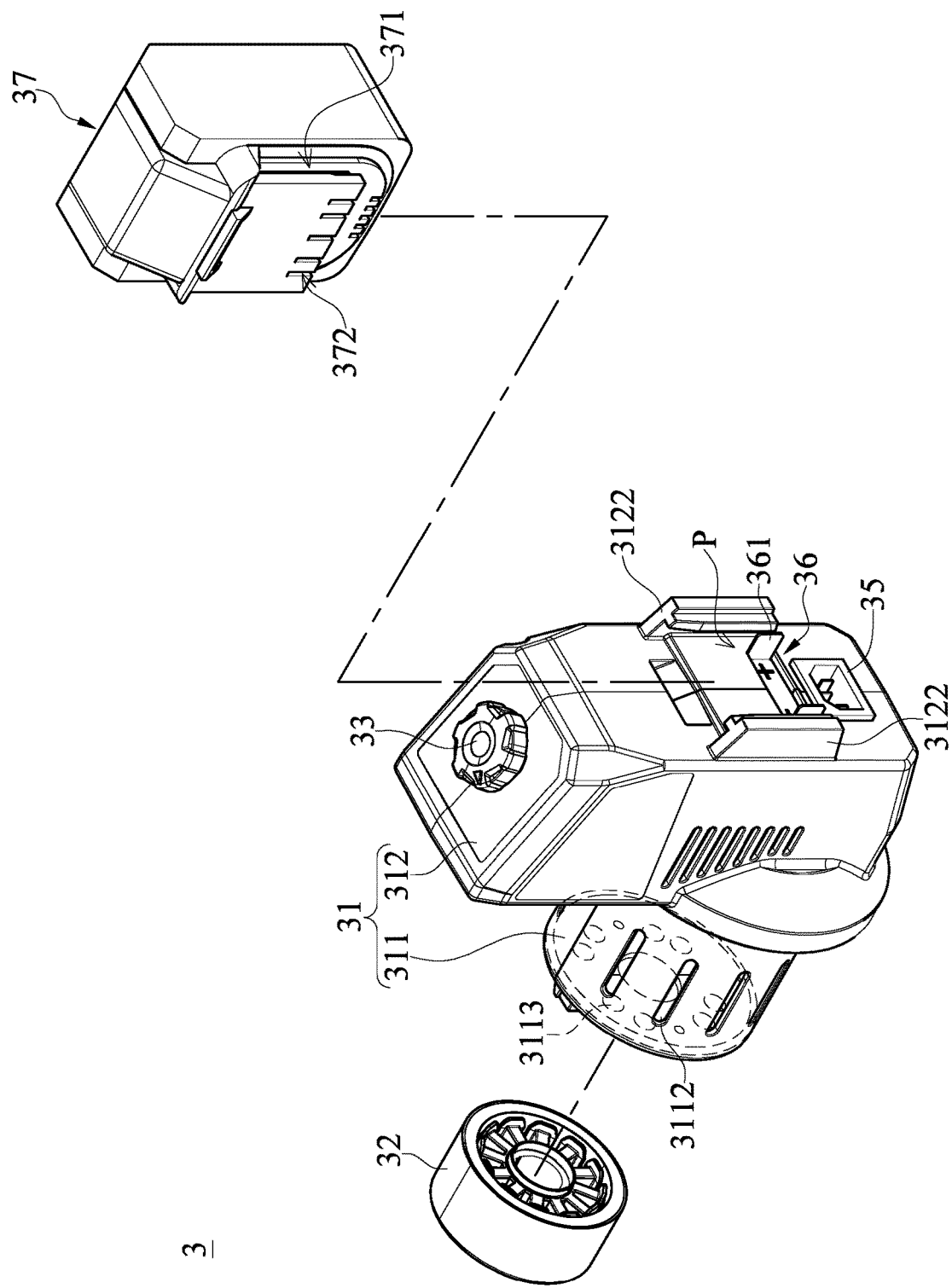
FIG. 4 is a schematic exploded view of the drive apparatus of the DC brushless fan according to the present disclosure.
Figure 6:
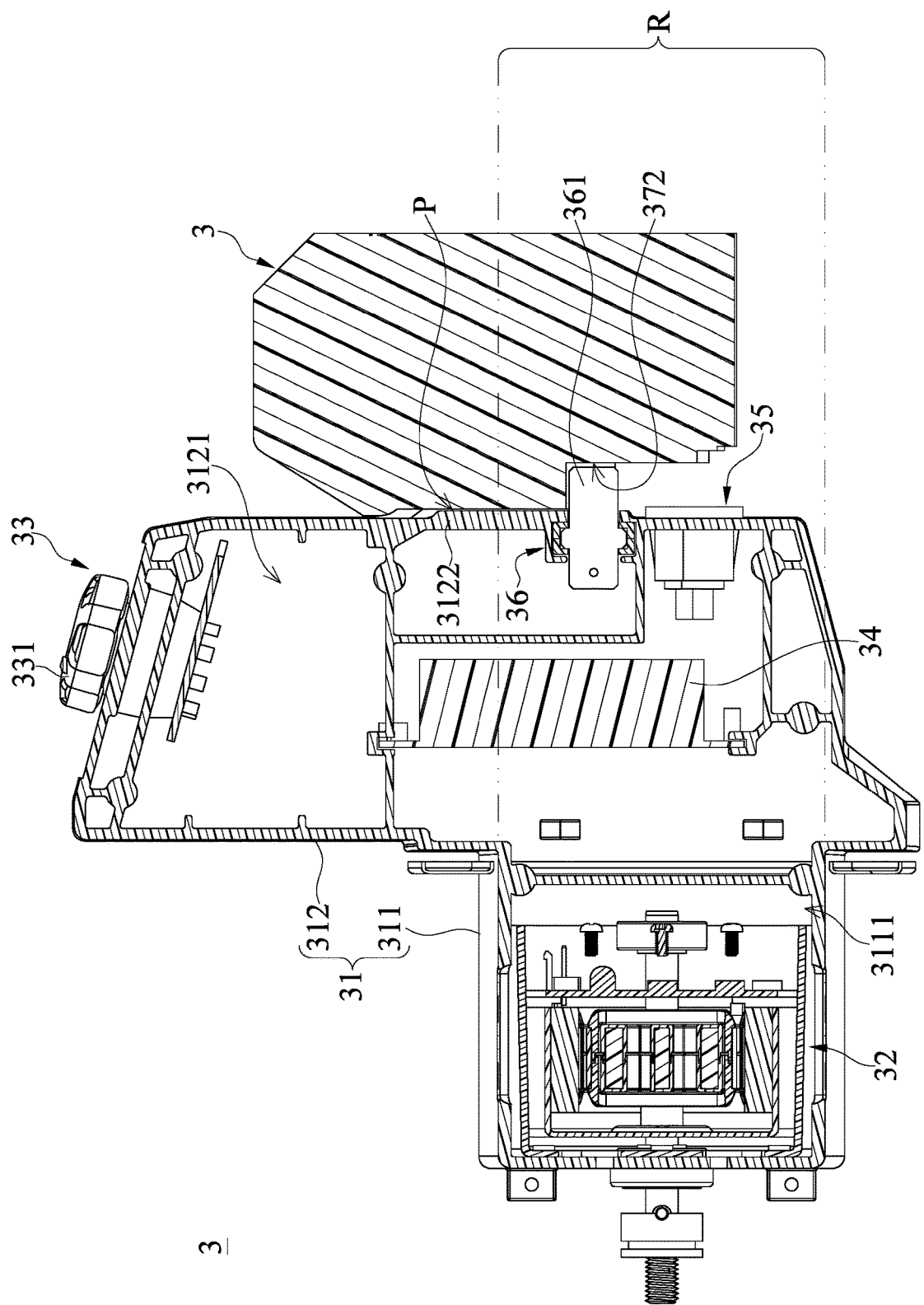
FIG. 6 is a schematic cross-sectional view taken along line VI-VI of FIG. 5.

Referring to FIG. 3, FIG. 4, and FIG. 6, the drive apparatus 3 includes a housing 31, a DC brushless motor 32 disposed in the housing 31, a control unit 33 disposed in the housing 31, an adaptation unit 34 disposed in the housing 31, an alternating current (AC) input interface 35 disposed in the housing 31, a DC input interface 36 disposed in the housing 31, and a power storage 37 that is assembled on the housing 31.

Further, the drive apparatus 3 can obtain electrical energy by either being electrically connected to the AC input interface 35 or the DC input interface 36 that is electrically connected to the power storage 37. That is to say, the drive apparatus 3 can be supplied with the electrical energy from DC and AC. In other words, any drive apparatus (or any DC brushless fan) that cannot be supplied with the electrical energy from DC and AC is not the drive apparatus 3 (or the DC brushless fan 100) of the present disclosure.

Figure 5:
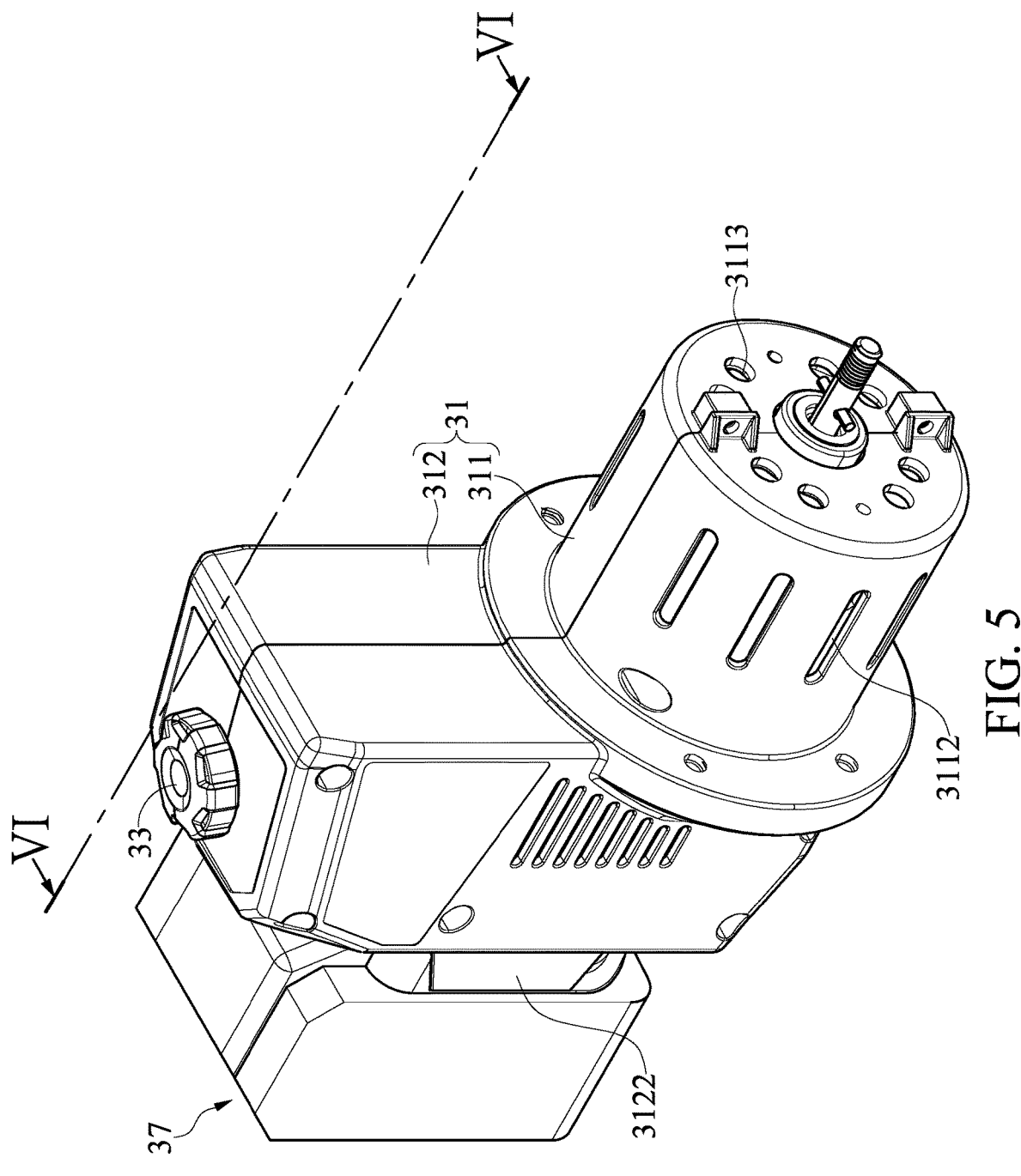
FIG. 5 is a schematic perspective view of the drive apparatus of the DC brushless fan according to the present disclosure.

Referring to FIG. 4 and FIG. 5, the housing 31 is disposed in the frame portion 12 of the fan seat 1. The housing 31 is in an L-shape and has a first portion 311 and a second portion 312 that is connected to the first portion 311. In detail, the first portion 311 is in a substantially cylindrical shape and is disposed in the frame portion 12 of the fan seat 1, and the second portion 312 is in a substantially rectangular shape and is disposed on a side surface of the frame portion 12 of the fan seat 1, but the present disclosure is not limited thereto. The first portion 311 has a drive space 3111, and the second portion 312 has a setting space 3121 in spatial communication with the drive space 3111. A side of the second portion 312 away from the first portion 311 has two mounting ribs 3122 spaced apart from each other. Further, a projection path defined by orthogonally projecting the first portion 311 toward the second portion 312 is defined as an installation range R (as shown in FIG. 6). In other words, a range of a path in an axial direction along which an outer edge of the first portion 311 extends toward the second portion 312 is the installation range R.

Referring to FIG. 4, the outer edge of the first portion 311 has a plurality of long holes 3112 that are in spatial communication with the drive space 3111 and that are spaced apart from each other to form a ring-shaped arrangement. A side surface of the first portion 311 away from the second portion 312 has a plurality of open holes 3113 that are in spatial communication with the drive space 3111 and that are spaced apart from each other to form a ring-shaped arrangement.

The DC brushless motor 32 is arranged in the drive space 3111 and is connected to the fan blade 2. The DC brushless motor 32 can drive the fan blade 2 to rotate. Specifically, when the DC brushless motor 32 drives the fan blade 2 to rotate, the heat generated from the DC brushless motor 32 in operation is dissipated through the long holes 3112 and the open holes 3113. It should be noted that the DC brushless fan 100 of the present disclosure drives the fan blade 2 through the brushless DC motor 32. In other words, any fan that does not drive the fan blade 2 through the DC brushless motor 32 is not the DC brushless fan 100 of the present disclosure (e.g., a fan driving fan blades thereof by a DC brushed motor).

The control unit 33 is disposed in the second portion 312 and is electrically connected to the DC brushless motor 32. In detail, the control unit 33 includes an operation portion 331 exposed from the housing 31. That is to say, a portion of the control unit 33 is arranged in the setting space 3121 of the housing 31. The operation portion 331 of the control unit 33 is configured to adjust the running speed of the DC brushless motor 32 or control the opening and closing of the DC brushless motor 32.

Referring to FIG. 6, the adaptation unit 34 is arranged in the setting space 3121 and is electrically connected to the control unit 33. The adaptation unit 34 is configured to convert AC to DC so as to provide for the use of the DC brushless motor 32. At least 80% of a volume of the adaptation unit 34 is arranged within the installation range R. A portion of the adaptation unit 34 arranged within the installation range R can thereby be located closer to an extended area along a rotating shaft of the DC brushless motor 32 so as to reduce a vibration of the adaptation unit 34 during the operation of the DC brushless motor 32. Therefore, a circuit electrically connected to the adaptation unit 34 can be prevented from falling off due to the vibration of the adaptation unit 34.

The AC input interface 35 is disposed in the second portion 312 and is arranged in the installation range R. The AC input interface 35 is electrically connected to the adaptation unit 34. The AC input interface 35 is configured to electrically connect to a utility power (i.e., AC). Accordingly, the AC input interface 35 can thereby be located closer to the extended area along the rotating shaft of the DC brushless motor 32 so as to reduce a vibration of the AC input interface 35 during the operation of the DC brushless motor 32. Therefore, a circuit electrically connected to the AC input interface 35 can be prevented from falling off due to the vibration of the AC input interface 35. The DC input interface 36 is disposed in the second portion 312 and is arranged in the installation range R (as shown in FIG. 6). The DC input interface 36 is electrically connected to the control unit 33. Accordingly, the DC input interface 36 can thereby be located closer to the extended area along the rotating shaft of the DC brushless motor 32 so as to reduce a vibration of the DC input interface 36 during the operation of the DC brushless motor 32. Therefore, a circuit electrically connected to the DC input interface 36 can be prevented from falling off due to the vibration of the DC input interface 36. Further, the DC input interface 36 includes an insertion portion 361 exposed from the housing 31, and the insertion portion 361 is configured to electrically connect to the power storage 37.

The power storage 37 is detachably disposed on the second portion 312 and is arranged at an installation position P of the second portion 312. When the power storage 37 is arranged at the installation position P of the second portion 312, the power storage 37 covers the AC input interface 35 and is electrically connected to the DC input interface 36. Accordingly, the power storage 37 arranged at the installation position P is configured to provide the electrical energy to the DC brushless motor 32 and prevent the AC input interface 35 from being plugged into utility power by the user.

In detail, an outer edge of the power storage 37 has two mounting grooves 371 spaced apart from each other and a connection groove 372 that corresponds in position to the insertion portion 361. The two mounting grooves 371 of the power storage 37 are configured to slidably connect to the two mounting ribs 3122 of the second portion 312, so that the power storage 37 is capable of being fixed at the installation position P. When the power storage 37 is arranged at the installation position P, the connection groove 372 is engaged with the insertion portion 361, so that the power storage 37 is capable of electrically connecting to the DC input interface 36, and at least 55% of a volume of the power storage 37 is arranged within the installation range R.

In conclusion, the DC brushless fan 100 and the drive apparatus 3 of the present disclosure can obtain the electrical energy from the DC input interface 35 and the AC input interface 36, so that the drive apparatus 3 can not only use utility power (i.e., AC) from the AC input interface 35 as the electrical energy in an indoor environment but also use the power storage 37 (i.e., DC) from the DC input interface 35 as the electrical energy in an outdoor environment (i.e., an environment without utility power). Accordingly, the DC brushless fan 100 is not limited to the environmental condition of requiring utility power, thus providing more convenience for users.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A direct current (DC) brushless fan, comprising:
    a fan seat;
    a fan blade disposed in the fan seat; and
    a drive apparatus disposed on the fan seat and connected to the fan blade, wherein the drive apparatus is configured to drive the fan blade to rotate, and the drive apparatus includes:
        a housing disposed on the fan seat, wherein the housing is in a shape of the letter "L" and has a first portion and a second portion that is connected to the first portion, wherein the first portion has a drive space, and the second portion has a setting space in spatial communication with the drive space, and wherein a projection path defined by orthogonally projecting the first portion toward the second portion is defined as an installation range;
        a DC brushless motor arranged in the drive space, wherein the DC brushless motor is connected to the fan blade;
        a control unit disposed in the second portion and electrically connected to the DC brushless motor;
        an adaptation unit arranged in the setting space, wherein at least 80% of a volume of the adaptation unit is arranged within the installation range, and wherein the adaptation unit is electrically connected to the control unit;
        an alternating current (AC) input interface disposed in the second portion and arranged in the installation range, wherein the AC input interface is electrically connected to the adaptation unit, and wherein the AC input interface is configured to electrically connect to a utility power;

a DC input interface disposed in the second portion and arranged in the installation range, wherein the DC input interface is electrically connected to the control unit; and a power storage detachably disposed on the second portion and arranged at an installation position of the second portion, wherein when the power storage is arranged at the installation position of the second portion, the power storage covers the AC input interface and is electrically connected to the DC input interface.

2. The DC brushless fan according to claim 1, wherein a side of the second portion away from the first portion has two mounting ribs spaced apart from each other, wherein an outer edge of the power storage has two mounting grooves spaced apart from each other, and the two mounting grooves of the power storage are configured to slidably connect to the two mounting ribs of the second portion, so that the power storage is capable of being fixed at the installation position.

3. The DC brushless fan according to claim 1, wherein the DC input interface includes an insertion portion exposed from the housing, wherein the power storage includes a connection groove corresponding in position to the insertion portion, and wherein when the power storage is arranged at the installation position, the connection groove is engaged with the insertion portion, so that the power storage is capable of electrically connecting to the DC input interface.

4. The DC brushless fan according to claim 1, wherein when the power storage is arranged at the installation position, at least 55% of a volume of the power storage is located at the installation range.

5. The DC brushless fan according to claim 1, wherein the first portion is in a substantially cylindrical shape, wherein an outer periphery of the first portion has a plurality of long holes that are in spatial communication with the drive space, and that are spaced apart from each other to form a ring-shaped arrangement, and wherein a side surface of the first portion away from the second portion has a plurality of open holes that are in spatial communication with the drive space, and that are spaced apart from each other to form a ring-shaped arrangement.

6. The DC brushless fan according to claim 1, wherein the control unit includes an operation portion exposed from the housing, and wherein the operation portion is configured to control the DC brushless motor.

7. A drive apparatus that is configured to drive a fan blade of a direct current (DC) fan to rotate, wherein the drive apparatus comprises:

a housing disposed on a fan seat, wherein the housing is in a shape of the letter "L" and has a first portion and a second portion that is connected to the first portion, wherein the first portion has a drive space, and the second portion has a setting space in spatial communication with the drive space, and wherein a projection path defined by orthogonally projecting the first portion toward the second portion is defined as an installation range;

a DC brushless motor arranged in the drive space, wherein the DC brushless motor is connected to the fan blade;

a control unit disposed in the second portion and electrically connected to the DC brushless motor;

an adaptation unit arranged in the setting space, wherein at least 80% of a volume of the adaptation unit is arranged within the installation range, and wherein the adaptation unit is electrically connected to the control unit;

an alternating current (AC) input interface disposed in the second portion and arranged in the installation range, wherein the AC input interface is electrically connected to the adaptation unit, and wherein the AC input interface is configured to electrically connect to a utility power;

a DC input interface disposed in the second portion and arranged in the installation range, wherein the DC input interface is electrically connected to the control unit; and a power storage detachably disposed on the second portion and arranged at an installation position of the second portion, wherein when the power storage is arranged at the installation position of the second portion, the power storage covers the AC input interface and is electrically connected to the DC input interface.

8. The drive apparatus according to claim 7, wherein a side of the second portion away from the first portion has two mounting ribs spaced apart from each other, wherein an outer edge of the power storage has two mounting grooves spaced apart from each other, and the two mounting grooves of the power storage are configured to slidably connect to the two mounting ribs of the second portion, so that the power storage is capable of being fixed at the installation position.

9. The drive apparatus according to claim 7, wherein the DC input interface includes an insertion portion exposed from the housing, wherein the power storage includes a connection groove corresponding in position to the insertion portion, and wherein when the power storage is arranged at the installation position, the connection groove is engaged with the insertion portion, so that the power storage is capable of electrically connecting to the DC input interface.

10. The drive apparatus according to claim 7, wherein when the power storage is arranged at the installation position, at least 55% of a volume of the power storage is located at the installation range.

* * * * *